J. B. EADS.
Iron-Bridge.
No. 6,445.
Reissued May 25, 1875.
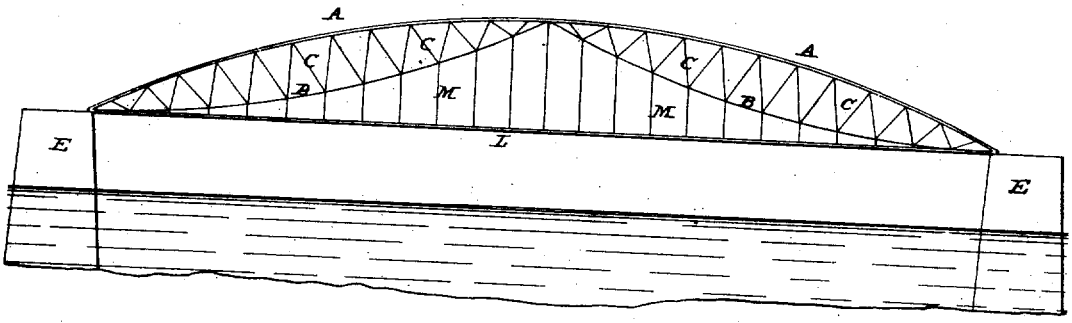
ATTEST:
Robt Burns.
Henry Sinnen.
INVENTOR:
James B. Eads.
By Knight Bros.
Attys.
THE GRAPHIC CO. PHOTO-LITH. 39 & 41 PARK PLACE, N.Y.

UNITED STATES PATENT OFFICE.

JAMES B. EADS, OF ST. LOUIS, MISSOURI.

IMPROVEMENT IN IRON BRIDGES.

Specification forming part of Letters Patent No. 142,381, dated September 2, 1873; reissue No. 6,445, dated May 25, 1875; application filed May 10, 1875.

DIVISION B.

*To all whom it may concern:*

Be it known that I, JAMES B. EADS, of St. Louis, St. Louis county, State of Missouri, have invented an Improvement in Bridges, of which the following is a specification:

My invention relates to the stiffening or bracing of bow-string girders, to resist change of form under unequal loading.

The distinctive features of my invention consist as follows:

First. In the application of the bracing, in two independent systems, to the under side of the two halves of the arch, by which the said arch is virtually divided into two distinct arches, each one forming half of the whole span, and therefore each of said arches may form half of a segment, which constitutes one single arch over the whole span, or each may constitute a distinctive segment of a curve which is peculiar to each half. The segments, therefore, whether constituting the entire arch or two halves of it, may be segments of a circle, or they may be elliptic, parabolic, or of any desired curvature.

Second. It consists in each system of bracing thus applied to each half of the arch, being independent in its functions from the tie, chord, or bow-string, which prevents the arch from spreading at the abutments.

Third. It consists in the use of two longitudinal members, each joined to the arch at the center of the span, and each having its other end secured to one end of the arch—that is, one member to each end of the arch.

Fourth. It consists in the interposition of any suitable system of bracing or webbing between the said longitudinal members and the arch above them, which, when thus interposed and secured to said longitudinal members and arch, constitutes two complete and distinct systems of bracing, each of which pertains to one particular half of the arch, and enables each half to be constructed and erected singly with its separate system of bracing.

When this method of bracing is applied to arches which are retained by abutments, a central joint is necessary in the center of the span, and likewise at the abutments, to accommodate the expansion and contraction of the metal of the arches when affected by temperature; but when the ends of the arches are not held by abutments, but by a chord, tie, or bow-string, (as in the present instance,) which chord is equally affected by temperature, these joints are unnecessary.

In the drawing, the suspenders M M, which support the bow-string or tie L, constitute no part of the bracing, but act simply as suspension-rods, and are attached to the longitudinal members simply to support the vertical weight of the tie and roadway.

If half the span of an upright arch be loaded, a horizontal impulse is given to the arch at the crown, tending to move its center point toward the unloaded half. To prevent this horizontal movement of the center of the arch is a desideratum of the utmost importance; and as the deflection of the unloaded half depends almost wholly on the horizontal movement of the central point, it will be evident that any system of bracing which, while tending to stiffen the arch, increases the impulse of a partial load to move its center in the direction of the unloaded half-span, must be in conflict with economy. This objectionable feature is found where the arch is stiffened by any of the known systems of bracing placed above it, as in spandrel bracing or the bracing of the ribs of the jointed-arch bridge at Szegidin, in Europe.

When the bracing is above the arch the load produces, in the loaded half, compressive strains in the upper longitudinal member of the bracing, and these strains are transmitted by the braces at the ends of the longitudinal member to the center of the arch, and consequently tend to increase the horizontal movement of that part of the arch toward the unloaded side; hence, resistance to the strains, when the arch is thus braced, must be had by increase of material in the arch itself and in the bracing.

If the longitudinal members and bracing referred to be placed beneath (instead of over) the arch, as in the present improvement, these objections vanish, because the strains in the longitudinal members of the bracing are then reversed, and great economy of material is secured. Under the loaded half they become tensile strains in the longitudinal member, and it therefore resists the horizontal movement of the central point by pulling directly against it, which tends to prevent the spread or flattening of that half; and under the unloaded half they are compressive strains, and push against the center, and this lessens the compressive strain in the unloaded part of the arch, while the intermediate bracing prevents the distortion of this half of the arch and its longitudinal member. Hence, if bracing be thus placed below the arched member of each half-span, the horizontal movement of the center is prevented, and we have the most economical solution of the problem of bracing arched spans to resist the effect of unequal loading which it is possible to accomplish. We consequently have the most economical system of superstructure for roofs and bridges that is possible.

The drawing is a side view of a bridge of my improved construction.

A A is an arch or arched rib of a bridge. B B are inverted arches or longitudinal members, connected firmly to the arch A A at the ends of said members, and connected to the main arch, between their ends, by any suitable brace-work, C, which may be lattice, double or single triangular, or any other system deemed most judicious. E E are piers. L represents the tie, chord, or bow-string which holds the ends of the arch A A from spreading, the arch being used for a bow-string girder. It (L) may also represent the line of roadway. The arch A A, with its two counter-arches or longitudinal members, constitutes one rib of the bridge. There should be in one span of the bridge two or more of these ribs, according to strength and width required.

When a partial load is on one end of the span, as designed in Fig. 1, the counter-arch under the loaded end is strained by tension as the weight is transmitted to it by the vertical bracings between the main and counter arches upon that side. The counter-arch at the ununloaded end is at this time under compression, and forms, with the unloaded half of the main arch, an inclined strut between the center of the arch and its end at the pier, which transmits the pressure caused by the load to the unloaded end of the main arch. The unloaded counter-arch, in drawing, by its compressive strength and vertical attachment, to the unloaded half of the main arch, resists a part of the compressive strain upon the arch, and prevents that part of it from rising up and losing its proper curvature.

In constructing the arches, the greatest economy will be attained by making all the members straight between the points of attachment of the vertical bracing.

I would recommend that the longitudinal members or counter-arches be of similar curvature to the main arch; the straighter they are the greater will be the strain upon them. By the increased curvature of these members the strains in them will be reduced, but the lengths of the vertical bracing will be increased. The longitudinal members should, of course, be formed to resist compression as well as tension.

I claim as my invention—

The within-described method of bracing the arches of a bow-string girder, the bracing being secured under each half-arch of the span, as described, and performing its functions independently of the chords or ties which resist the thrust or spread of said arches.

JAS. B. EADS.

Witnesses:
SAML. KNIGHT,
R. S. ELLIOTT.